Feb. 22, 1949.   H. M. SCHUBERT   2,462,682
CHERRY STEMMING AND SORTING MACHINE
Filed May 24, 1946   3 Sheets-Sheet 1

INVENTOR.
HOMER M SCHUBERT
BY
Atty.

Feb. 22, 1949.  H. M. SCHUBERT  2,462,682
CHERRY STEMMING AND SORTING MACHINE
Filed May 24, 1946  3 Sheets-Sheet 2

INVENTOR.
HOMER M. SCHUBERT
BY
Atty.

Feb. 22, 1949. H. M. SCHUBERT 2,462,682
CHERRY STEMMING AND SORTING MACHINE
Filed May 24, 1946 3 Sheets-Sheet 3

INVENTOR.
HOMER M SCHUBERT

Patented Feb. 22, 1949

2,462,682

UNITED STATES PATENT OFFICE 2,462,682

CHERRY STEMMING AND SORTING MACHINE

Homer M. Schubert, Salem, Oreg.

Application May 24, 1946, Serial No. 672,090

7 Claims. (Cl. 146—55)

This invention relates to fruit sorting machines and is particularly adapted to the sorting of cherries.

The primary object of the machine is to separate the cherries having stems from those not having stems.

Another object of the invention is to provide means within the machine for removing the stems from cherries.

In the carrying out of the object of separating the cherries having stems from those not having stems a conveyor runs longitudinal and transversely of a specially constructed apron. The apron picking the cherries up by the stems and raising them over the conveyor and releasing them on to the conveyor. Those cherries not having stems are delivered out through the side of the apron into a separate chute. The apron is inclined to one side permitting the rolling of the cherries across the apron while the same is being revolved.

When the machine is used for the removing of the stems from the cherries a special roller having flexible fingers extending out therefrom is installed, said fingers brushing the cherries off of the stems when the stems and the cherries are being suspended from the above said apron.

These and other incidental objects will be apparent in the specification, drawings and claims.

Referring to the drawings.

In the drawings.

Figures 1, 2:
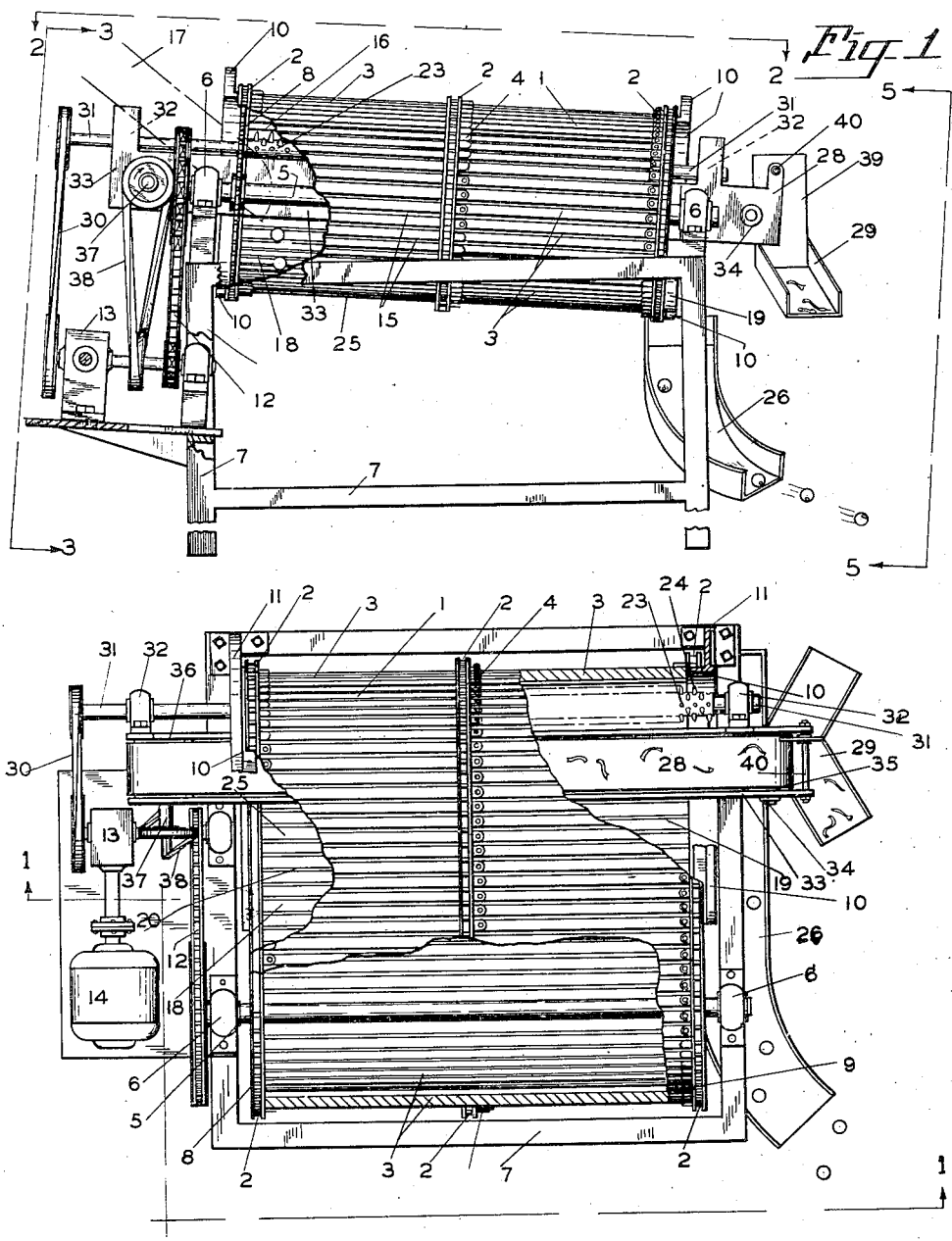
Figure 1 is a side view of my new and improved cherry sorting machine, parts broken away for convenience of illustration and taken on line 1—1 of Figure 2.
Figure 2 is a plan view with parts broken away for the convenience of illustration, both of these views show the machine as used for the removing of stems from the cherries, taken on line 2—2 of Fig. 1.

My new and improved cherry sorting machine consists of an endless apron 1, consisting of chains 2 having slats 3 secured thereto by the usual fastening means 4. This apron runs transversely of the machine and the flow of cherries therethrough runs transversely of the apron.

A shaft 5 is journalled in bearings 6, said bearings being mounted upon the frame of the machine 7. Keyed to this shaft are sprockets 8 and 9 and about which are trained the chains 2. The opposite side of the apron 1 is trained about guide shoes 10, which form part of the brackets 11, said brackets are bolted to the frame 7. The object of providing shoes for the opposite side of the apron instead of sprocket wheels is to provide a clear and open space through the side of the apron for discharging the cherries from the apron. The shaft 5 is driven by a chain 12 from the speed reducer 13, which in turn is driven by a motor 14.

Figure 4:
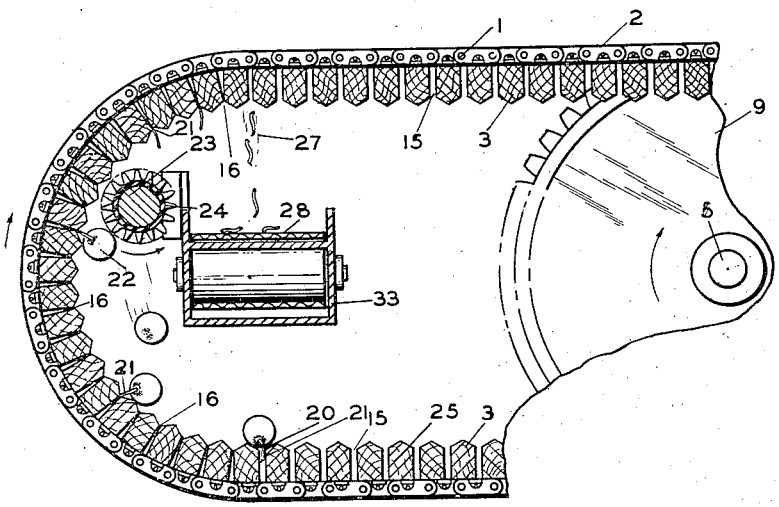
Figure 4 is a fragmentary enlarged diagrammatical cross section of the apron illustrating the principle of removing the stems from the cherries.
Figure 5:
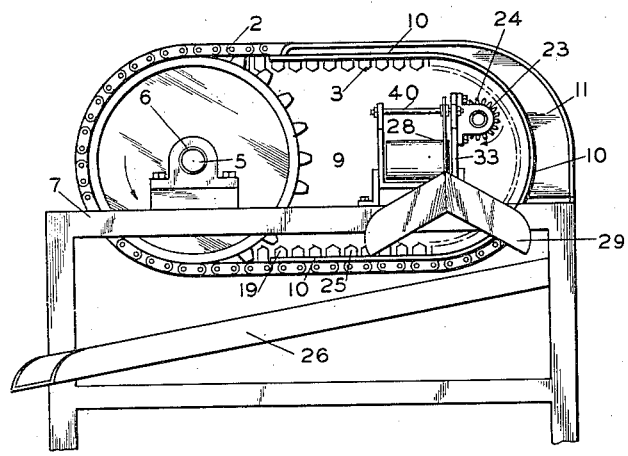
Figure 5 is an end view of the machine taken on the discharge end.
Figure 7:
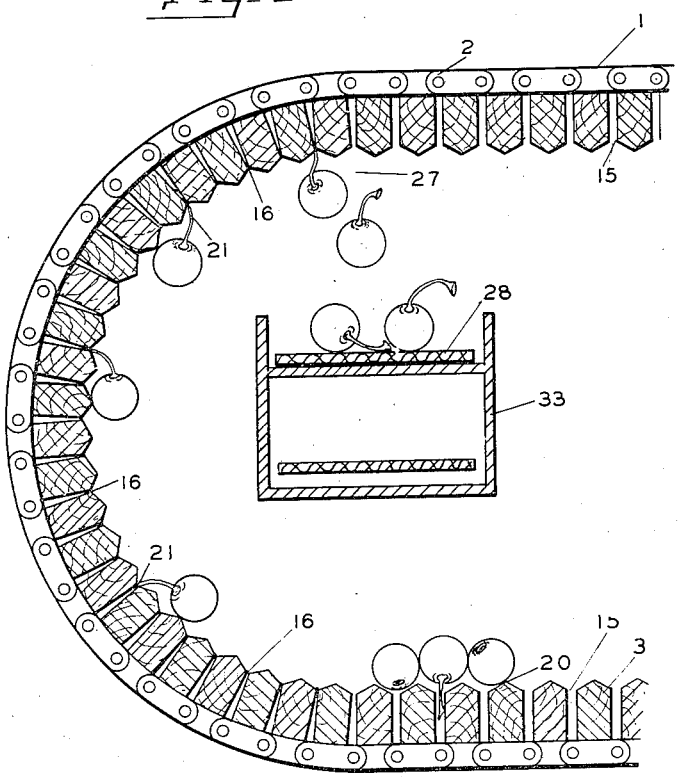
Figure 7 is a fragmentary diagrammatical enlarged sectional view of the apron and conveyor separating the cherries having stems from those not having stems. In this operation the stem removing device illustrated in Figure 6 is removed.

As the shaft 5 is rotated the sprocket wheels 8 and 9 are rotated revolving the apron 1 with the chains 2, said chains being trained about the guide shoes 10. Referring to Figures 4 and 7 it will be noted that while the apron 1 is travelling on its straight run the cross slats 3 are separated apart at 15, but come together at 16 while making the turn around the shoes 10.

A suitable chute 17, indicated by broken lines in Figure 2, delivers the cherries into the apron 1 at 18 and as the apron is revolved the cherries work towards the discharge end at 19. The cherries having stems, as illustrated at 20 in Figures 4 and 7, have their stems gripped between the slats at 21, and as the apron travels around the shoes 10 the cherries will be lifted to the position as shown in Figure 4 at 22 where they will be removed from their stems by the action of the roller 23, said roller running longitudinally of the slats or transverse the apron.

The roller rotates in the direction of the arrow and has flexible nipples 24 located completely around its outer surface. These nipples are preferably made of rubber or the like, and as the apron travels upwards raising the cherries they will contact these nipples pulling the cherries away from their stems allowing them to roll back on the bottom side 25 of the apron from where they will roll towards the discharge side 19 of the apron into the chute 26.

As the stems are raised to the position shown at 27 they will be released and dropped on the conveyor belt 28 and delivered to the discharge chutes 29. This is the principle employed for removing the stems from the cherries. The roller 23 is driven by the belt 30 from the speed reducer 13 and is mounted to a shaft 31 which is journalled within bearings 32, said bearings being bolted to the side of the conveyor 28. The conveyor 28 consists of a suitable frame 33, which is mounted to the frame 7 of the machine by the brackets 33A.

Figure 3:
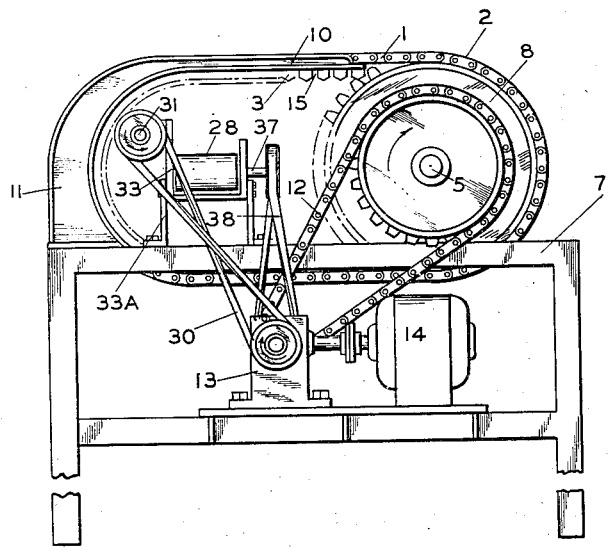
Figure 3 is an end view of the machine, said view being taken on the feed end and particularly illustrating the method of driving the various parts.

The belt 34 is trained about rollers 35 and 36. The shaft 37 of the roller 36 is driven by a belt 38 from the speed reducer 13, best illustrated in Figures 1, 2 and 3. When it is desired to separate the cherries having stems, the cherries are entered into the machine as before through the chute 17, indicated by the broken lines, to the point 18 on the apron and as they roll to the discharge side 19 of the apron their stems are engaged by the slats 3 as at 20, and as the slats begin to revolve about the shoes 10 they close up at 21 pinching the stems as described above raising them as indicated in the diagrammatical layout in Figure 7. When the slats separate at 27 they will drop the cherries on the conveyor 28 from where they will be moved to the discharge chutes 29 into containers not here shown.

Figure 6:
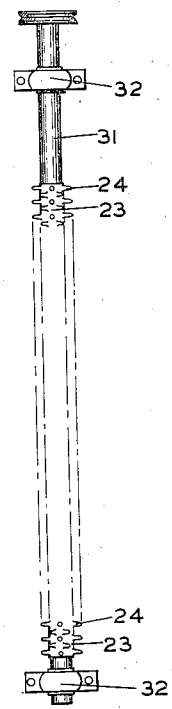
Figure 6 is a view of the roller used for removing the stems from the cherries, the same being disconnected from the machine.

The cherries not having stems will continue to roll along on the bottom run 25 of the apron to the discharge point 19 and chutes 26, thereby making a separation of the cherries with stems and those that do not have stems. It will be noted that in the above operation the roller 23 has been removed, including its bearings, as best illustrated in Figure 6. The discharge chute 29 is hung by a bracket 39 to the cross rod 40 secured to the conveyor frame 33. The object of the bracket being supported by the rod 40 is to shift the chutes while the containers are being changed thereunder.

I do not wish to be limited to the exact mechanical structure as illustrated, as other equivalents may be substituted still coming within the scope of my claims.

What I claim as new is:

1. A cherry sorter and stemmer, including a frame, an endless driven conveyor moving in the frame and moving in a path defining substantially parallel straight portions and curved end portions, and slats connected to and projecting inwardly of the conveyor with their adjacent sides during travel of the conveyor being spaced apart a distance to exclude entrance of a cherry and permit entrance of the cherry stem, the sides of the slats in the curved end paths of the travel of the conveyor moving into a path to grip any interposed cherry stem, means for feeding the stemmed cherries onto the straight portion of the conveyor to receive the stems of the cherries, said slats gripping the carried cherries' stems and supporting the connected cherries in moving in the curved path of travel of the conveyor; and means adjacent such path of travel of the conveyor for engaging and interrupting the movement of the carried cherries to separate the carried cherries and the slat-gripped stems.

2. A construction as defined in claim 1, wherein the means for engaging and interrupting movement of the conveyor-carried cherries, includes a driven rotating member having cherry-engaging projections.

3. A construction as defined in claim 1, wherein the slats after removal of the cherries from the gripped stems are moved into a straight portion of the conveyor and spaced to release the gripped stems, and wherein a belt is mounted in position to receive the released stems and convey such stems to a place of discharge.

4. A construction defined in claim 1, wherein the conveyor is formed of pivotally connected links and wherein the slats are elongated bodies supported from the links, the conveyor being mounted on an inclined axis and the slats moving their adjacent surfaces into gripping elements during travel of the conveyor throughout a particular part of the travel of the conveyor, whereby to grip the stems of the cherries delivered within the conveyor.

5. A cherry sorter and stemmer comprising a frame, an endless driven apron in the frame and moving in a path defining substantially straight portions and curved end portions, said apron including longitudinal chains and cross-slats secured to the inner sides thereof, and spaced apart a distance to exclude entrance of a cherry and permit entrance of the cherry stem, the sides of the slats in the curved end paths of the apron to grip any interposed cherry stem, means within said conveyor blocking the paths of cherries having their stems gripped by the slats of the curved end portion of the apron and thereby tearing the cherries from their stems.

6. The cherry sorter and stemmer according to claim 5 and further comprising a conveyor including a frame supporting the means blocking the paths of the cherries and a belt for the stems.

7. The cherry sorter and stemmer according to claim 5 and wherein said blocking means is a rotatable roller with flexible transverse nipples.

HOMER M. SCHUBERT.

REFERENCES CITED

The following references are of record in the file of this patent:

UNITED STATES PATENTS

| Number | Name | Date |
|---|---|---|
| 690,554 | Sanborn | Mar. 15, 1898 |
| 692,824 | Burleson | Feb. 11, 1902 |
| 1,400,352 | Forry | Dec. 13, 1921 |
| 1,568,700 | Urschel | Jan. 5, 1926 |
| 1,731,167 | Johnson | Oct. 8, 1929 |
| 1,743,240 | Ryder | Jan. 14, 1930 |
| 2,023,287 | Pardee et al. | Dec. 3, 1935 |
| 2,091,564 | Pardee et al. | Aug. 31, 1937 |

FOREIGN PATENTS

| Number | Country | Date |
|---|---|---|
| 526,128 | Great Britain | Sept. 11, 1940 |